United States Patent [19]

Bleakney

[11] Patent Number: 5,047,781
[45] Date of Patent: Sep. 10, 1991

[54] RADAR SENSING GENERATOR IN A MONOPULSE RADAR SYSTEM

[75] Inventor: William M. Bleakney, Sherman Oaks, Calif.

[73] Assignee: Hughes Aircraft Company, Los Angeles, Calif.

[21] Appl. No.: 736,932

[22] Filed: Jun. 5, 1968

[51] Int. Cl.$^5$ .............................................. G01S 13/00
[52] U.S. Cl. .................................................. 342/149
[58] Field of Search .............. 343/16, 165 D; 342/149

[56] References Cited

U.S. PATENT DOCUMENTS

| | | | |
|---|---|---|---|
| 3,112,479 | 11/1963 | Pidhayny et al. ............ | 343/16 U X |
| 3,113,310 | 12/1963 | Standing ................................ | 343/16 |
| 3,178,711 | 4/1965 | Case, Jr. ................................ | 343/16 |
| 3,267,475 | 8/1966 | Howard ........................ | 343/16 U X |
| 3,353,180 | 11/1967 | Anderson ................................ | 343/16 |
| 3,467,963 | 9/1969 | Van Popta ............................ | 343/16 |

*Primary Examiner*—Mark Hellner
*Attorney, Agent, or Firm*—Leonard A. Alkoy; Wanda K. Denson-Low

[57] ABSTRACT

An improved airborne target tracking monopulse radar system is disclosed which includes a null command generator, designed to provide an error signal which represents the angle between a target direction and the antenna's monopulse null direction. The generator is supplied with signals on sum and difference channels and a frequency which represents a selected target. The error signal is produced by first differentiating the sum channel signals and subtracting the differentiated output from the difference channel signals. The difference output is then multiplied with properly phased sum channel signals to produce the desired error signal.

16 Claims, 7 Drawing Sheets

RADAR SENSING GENERATOR IN A MONOPULSE RADAR SYSTEM

BACKGROUND OF THE INVENTION

1. Field of the Invention

This invention generally relates to a radar system and, more particularly, to improvements in a target tracking radar system.

2. Description of the Prior Art

In each conventional, prior art, monopulse radar system, used for ground target tracking, reliance is placed on beam patterns in sum and difference channels. These patterns represent energy which is reflected by a particular target. The patterns are processed frequency wise with respect to a frequency which is associated with the target in order to position or align the antenna so that it points accurately, toward the target. Such a target tracking technique can only be used if the required tracking accuracy is not great and/or if the reflected energy versus noise from the target, i.e., the signal-to-noise ratio is high. If, however, a weak target has to be tracked, the noise in the system, including thermal noise, may nearly obliterate the weak signals from the target so that accurate tracking becomes impossible.

If a larger area, around the target, is accepted in order to increase the signal-to-noise ratio, then, variations of backscatter amplitude with azimuth angle affects target azimuth angle pointing. Weak return signals and high tracking accuracy characterize most airborne tracking radar system, designed to track a ground target. Thus, a need exists for improvements in a monopulse-type target tracking radar system, particularly of the airborne type, designed to track a ground target.

OBJECTS AND SUMMARY OF THE INVENTION

It is a primary object of the present invention to provide an improved target tracking radar system.

Another object of the present invention is to provide improvements in a monopulse-type target tracking radar system.

Yet another object of the present invention is the provision of an improved circuit in a target tracking monopulse radar system in order to increase tracking accuracy.

A further object of the present invention is to provide a new relatively simple and highly reliable circuit, for controlling the accurate positioning of a target-tracking-radar-system antenna, with respect to the tracked target.

Yet, a further object of the invention is to provide a circuit, with very fast response, to provide an error signal representing the difference between a frequency representing a monopulse null direction and a derived frequency which represents a known or computable parameter.

Still a further object is the provision of a relatively simple and highly reliable circuit for deriving a signal representing the angle between a target direction and the null direction of a monopulse antenna.

These and other objects of the invention are achieved by providing a circuit, in a target tracking monopulse radar system, which responds to the sum and difference outputs of a monopulse receiver, and to a precise target doppler frequency. In response to these inputs, the circuit provides an error signal which is used to automatically adjust the antenna of the radar system, so that the azimuth of the monopulse null is aligned with the target which is being tracked.

The circuit, with minor additions may be used to provide an accurate error signal even when moving objects are present in the target area. The circuit may also be modified for providing aircraft motion compensation in an airborne radar target mapping system.

The novel features of the invention are set forth with particularity in the appended claims. The invention will best be understood from the following description when read in conjunction with the accompanying drawings.

DESCRIPTION OF THE PREFERRED EMBODIMENTS

In a first embodiment of the invention which will be described in detail, the novel circuit of the present invention, may be referred to as the null command generator (NCG), since its primary function in this embodiment is to provide an error signal, used to command the position of a monopulse antenna so that the azimuth of the monopulse null is aligned with or lies on the azimuth of a specific target which is to be tracked. Before proceeding to describe the NCG in sufficient detail, an example of a radar system, in which the NCG may be incorporated, will be described briefly in conjunction with FIG. 1, to which reference is made herein.

Figure 1:
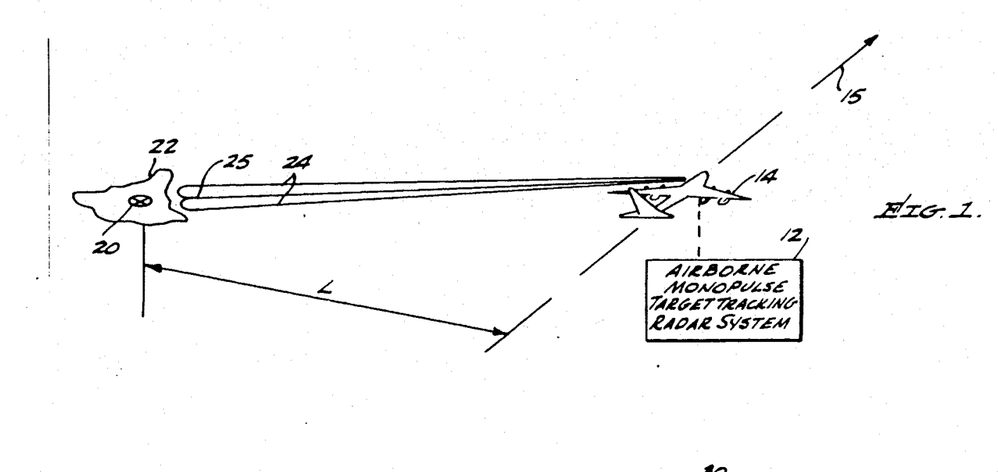
FIG. 1 is a simple diagram useful in explaining the use of the radar system in which the present invention is incorporated.

The NCG is assumed to be incorporated in a target tracking monopulse radar system 12 located in an airborne aircraft 14. The aircraft is assumed to fly in a direction 15, at a safe standoff distance L, from a target 20 which is assumed to be on the ground represented by the area enclosed by line 22. The function of system 12 is to continuously track the target 20 in azimuth as the aircraft flies by along line 15. Elevation tracking, if required, is provided by other means.

Figure 2:
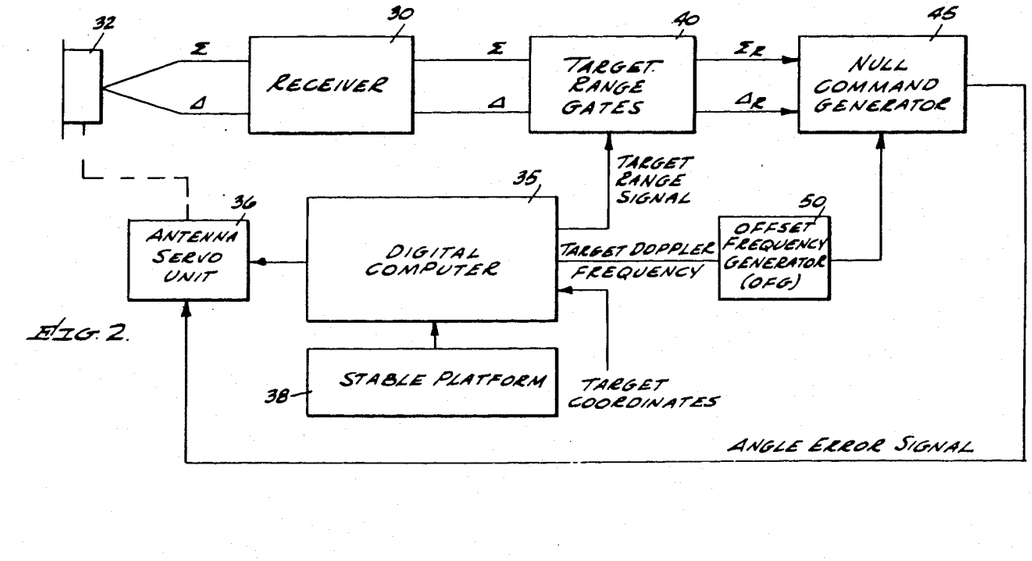
FIG. 2 is a block diagram of the radar system.

Gross azimuth tracking is provided by the processing of the beam patterns in the sum and difference channels of the monopulse receiver of system 12. The difference beam patterns are designated in FIG. 1 by numeral 24, and the monopulse null by line 25. Since any airborne radar system is inherently of limited power, the reflected signals from target 20 are assumed to be weak so that the signal-to-noise ratio is low. To compensate for the low signal-to-noise ratio, a relatively large target area is illuminated. Since variations in backscattering are nearly always present, likelihood exists, that returns from one side of the target area may exceed those from the other side, resulting in target pulling. Unless accounted for, such target pulling would produce an error in the proper alignment of the radar antenna with the target center. It is to overcome these difficulties that the NCG of the present invention is incorporated in the system 12, which is shown in FIG. 2 in further detail.

The system 12 consists of a receiver 30 which receives sum ($\Sigma$) and difference ($\Delta$) signals from a monopulse antenna 32. The circuitry, necessary for transmitting energy pulses in the direction of a target are purposely deleted, since such circuitry does not form a part of the teaching disclosed herein. The digital computer 35 performs several known functions when used in a target tracking radar system. These include, utilizing the target coordinates input data and aircraft position from the stable platform to grossly point the antenna monopulse null in the direction of a specific target, whose coordinates are stored to the computer. Antenna positioning is controlled by an antenna servo unit 36.

The computer 35, based on target coordinates supplied thereto and aircraft navigation data, computes a range interval which includes the target range. The computer provides a target range interval signal to target range gates 40 so that only the sum and difference signals from receiver 30, which are received from the computed target range interval, are supplied to a null command generator (NCG) 45, which constitutes the present invention. The NCG 45 is also supplied with frequencies from an offset target doppler frequency generator 50, which hereafter may be referred to, simply, as the offset frequency generator or the OFG.

As previously stated, the basic function of the NCG 45 is to utilize the range-gated sum and difference signals and the output of the OFG to derive an error signal. The error signal represents the angle between the actual monopulse plane and the true target direction. Alternately stated, the error signal is proportional to the difference between the target doppler frequency, as computed by computer 35, and the doppler frequency of terrain echoes in the antenna monopulse null. This error signal is supplied from the NCG 45 to the servo unit 36 to automatically position the antenna 32, so that the antenna monopulse null points in the direction of the target 20 (FIG. 1).

Before proceeding to describe the NCG 45 in sufficient detail to enable those familiar with the art to practice the invention, it would be helpful to designate several frequencies, which, in one embodiment of the invention, are assumed to be supplied to the NCG on the sum and difference channels or inputs, and from OFG 50. The sum signals may be represented by $f_{IF}+f_D(\theta)$, where $f_{IF}$ is the intermediate frequency of the received return radar signals, after passing through the IF stages of the receiver. The frequency $f_D(\theta)$ is the doppler frequency of the target at an angle $\theta$ away from the monopulse null.

For explanatory purposes, let it be assumed that the angle varies between limits $\theta_1$ and $\theta_2$. Similarly, the difference signals have frequencies $f_{IF}+f_D(\theta)$. The output frequencies of the OFG 50 may be represented by $f_{IF}+f_T-f_{CF}$, where $f_T$ is the target doppler frequency. $f_{CF}$ is a fixed offset frequency which represents the center frequency of a frequency discriminator which in a first embodiment of the invention forms part of the NCG. This embodiment will be described hereafter in detail.

In any specific application, the frequencies $f_{IF}$ and $f_{CF}$ are fixed. However, the frequency $f_T$ varies, as the aircraft 14 flies along the direction 15, $f_T=0$ when the aircraft is at a right angle with respect to the target. As previously stated, the actual target doppler frequency is computed by the computer which controls the OFG 50 to produce the desired target doppler frequency $f_T$ for subsequent supply to the NCG 45.

Figure 3:
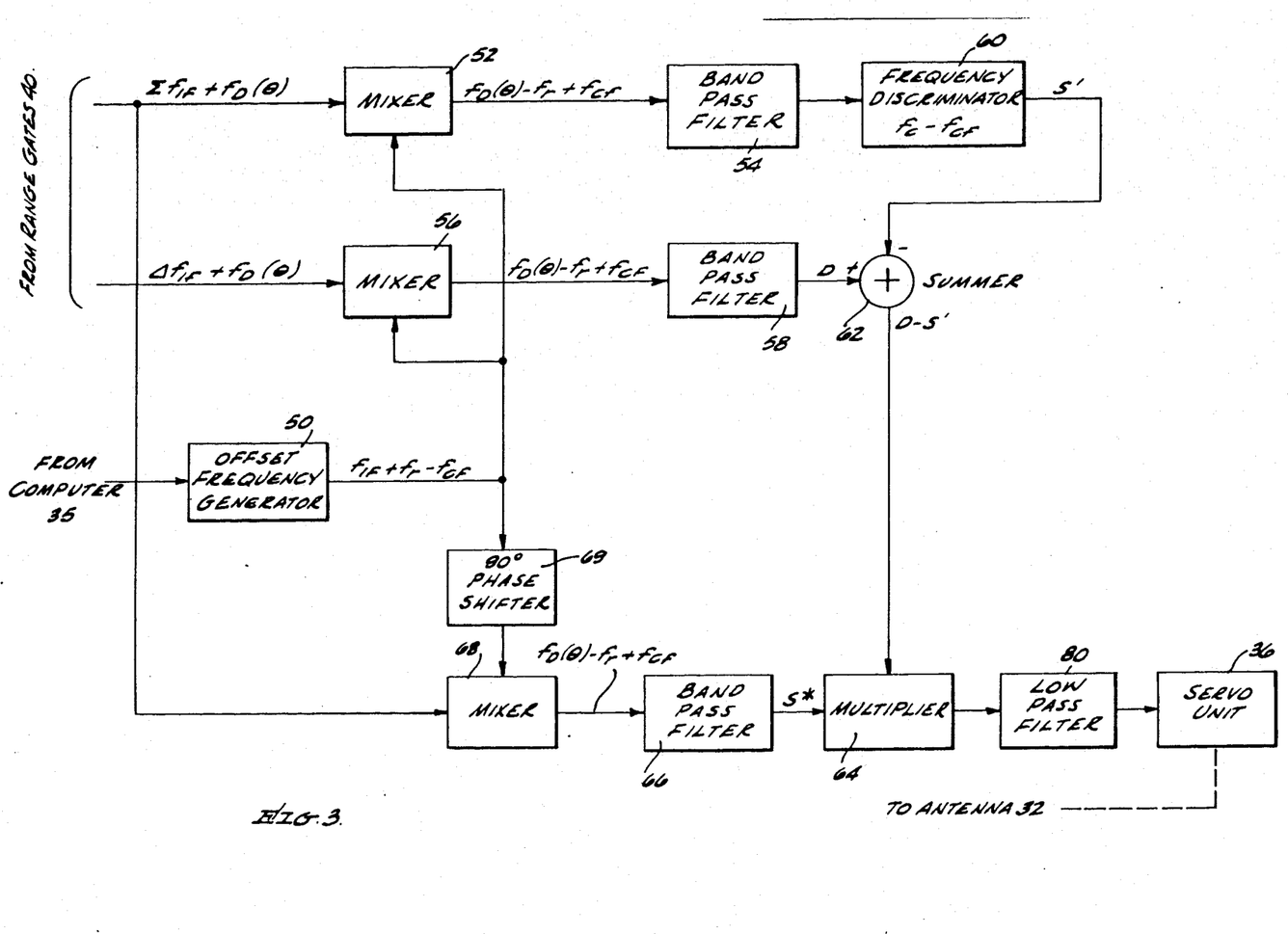
FIG. 3 is a block diagram of one embodiment of the invention.

Reference is now made to FIG. 3 which is basically a block diagram of one embodiment of the NCG 45 of the present invention. The OFG 50 and the servo unit 36 are also diagrammed in FIG. 3 in order to show the connections therebetween and the NCG 45. As shown in FIG. 3, in this embodiment of the invention, the NCG 45 includes a mixer 52 which mixes the frequencies of the sum channel signals and those provided by OFG 50, producing an output representable by $f_D(\theta)-f_T+f_{CF}$. The output of mixer 52 is filtered in a bandpass filter BPF 54. Likewise, the difference channel signals are mixed with the output of OFG 50 in a mixer 56, and the output ($f_D(\theta)-f_T+f_{CF}$) of the latter is supplied to a bandpass filter 58. The center frequency of each of filters 54 and 58 should be approximately equal to $f_{CF}$. The frequency bandwidth of each filter should be of the order of the doppler frequency subtended by the 3dB points on the antenna sum pattern, which will be diagrammed and described hereafter. Alternately stated, the frequency bandwidth should correspond to the angle range of $\theta_2-\theta_1$.

In the particular embodiment of the invention, shown in FIG. 3, the output of BPF 54 is supplied to a frequency discriminator 60 with a center frequency $f_C=f_{CF}$, so that the output of the discriminator is zero in response to signals at the center frequency $f_{CF}$. The bandwidth of discriminator 60 is chosen so that the incoming bandwidth to it lies on its linear region of operation.

The output of discriminator 60, which in essence represents the derivative of the input sum channel signal, biased to null at the center frequency, is supplied to the negative (−) input of a summing circuit or simply summer 62. The summer 62 is also provided with the output of the bandpass-limited difference channel signals from filter 58. Briefly, disregarding backscattering coefficients, the sum channel signals may be represented as S, the difference channel signals as D, and the output of discriminator as S'.

The output of summer 62 which may be expressed as $D-S'$, represents the error. To sense the error polarity, the summer's output $D-S'$ is supplied as one input to a multiplier 64 which is also supplied with the output of a BPF 66 which is similar to the BPF's 54 and 58. The input to the BPF 66 is supplied from a mixer 68. The latter mixes the sum channel signals with the output of a phase shifter 69 which shifts the frequencies from the OFG 50 by 90°. The 90° phase shifting is required to properly relate the phases of the sum channel signals with the signals $D-S'$. The output of BPF 66, which is the same as the output of BPF 54, except for a 90° phase difference, may be represented by S*. Consequently, the output of multiplier 64 may be expressed as $$\epsilon = S^*(D-S').$$

The output $\epsilon$ represents the angle error between the antenna monopulse null and the target direction, which in the NCG is represented by the target doppler frequency $f_T$, a frequency computed by the computer. Alternately stated, $\epsilon$ represents the difference between the target doppler frequency and the antenna monopulse null doppler frequency. To eliminate the frequency difference the output $\epsilon$ of the multiplier 64 is supplied to the servo unit 36 through a very lowpass filter 80 whose output is a DC signal.

The amplitude of the DC signal represents the error amplitude, and its polarity represents the direction of the error of the antenna monopulse null with respect to the desired target direction. Unit 36 corrects the azimuth of the antenna monopulse null so as to minimize the value of $\epsilon$, i.e., the angle error, which in this application represents the direction error between the monopulse plane and the target direction. The response time of the NCG, due to the relatively large bandwidth of the filters, has been found to be quite fast, which greatly contributes to the usefulness of the NCG in target tracking with a monopulse radar system aboard a fast aircraft.

Figure 4:
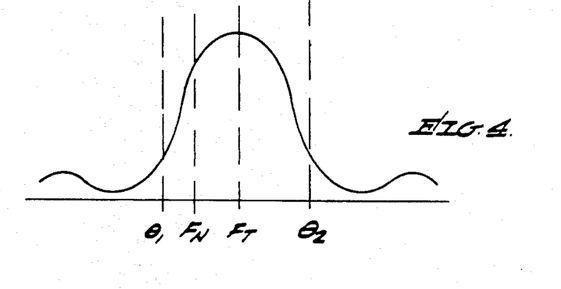
FIGS. 4–8 are diagrams, useful in explaining the operation of the present invention.

The principles of operation of the part of the NCG, described so far, may best be explained in conjunction with FIGS. 4 through 7 to which reference is made herein. In these figures, the effect of backscattering is purposely deleted. FIG. 4 represents the signals in the sum channel in a bandwidth BW which was previously defined as $\theta_2-\theta_1$, centered about a frequency $f_T$. In this figure, $f_T$ represents the target doppler frequency which corresponds to the actual direction of the target from the aircraft. The direction of the antenna monopulse null is represented by the dashed line located at $f_N$.

Figure 5:
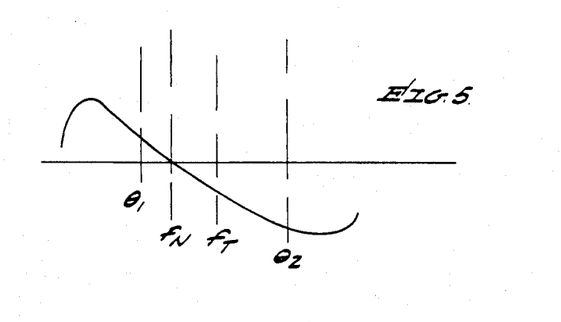
Figure 6:
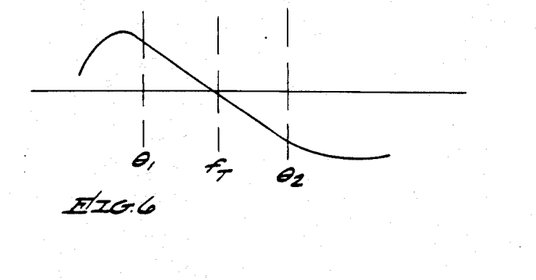

FIG. 5 on the other hand is a diagram of the difference channel output over the same bandwidth. It should be clear that in FIG. 5 the zero crossing point occurs at $f_N$, which represents the antenna monopulse null direction. FIG. 6 is a diagram of the differentiated sum channel S', where the zero crossing point occurs at the center frequency of the discriminator 60. However, since that center frequency $f_{CF}$, merely represents an offset of the actual target doppler frequency $f_T$, the zero crossing point is shown in FIG. 6 to occur at the target doppler frequency $f_T$. Representing the diagrams of FIGS. 5 and 6, between $\theta_1$ and $\theta_2$ as lines 71 and 72 in FIG. 7, the two lines are parallel if the gain at the outputs of BPF's 54 and 58 are the same.

Figure 7:
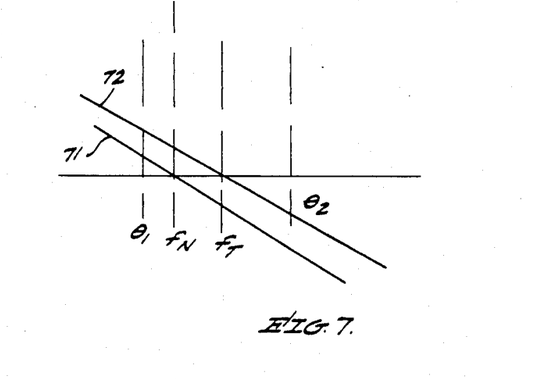
Figure 8:
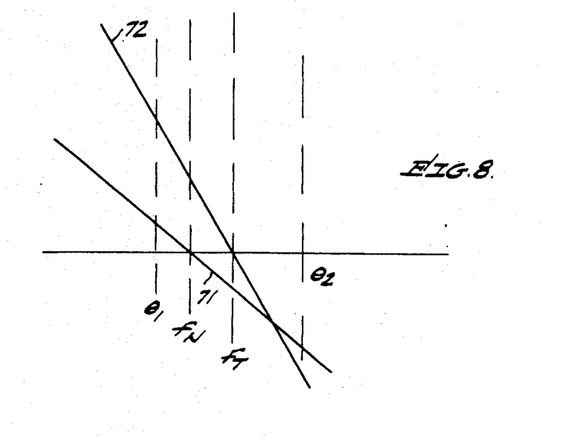

FIG. 8 is the counter example to FIG. 7 where the output of BPF 54 is greater than the output of BPF 58. Consequently, the slope of line 72 is greater than the slope of line 71. The output of summer 62 is proportional to the area between the lines weighted by the backscattering coefficient in each direction $\theta$. For the condition of FIG. 7, this difference is zero only when $f_N=f_T$, i.e., the antenna monopulse null doppler frequency equals the target doppler frequency. If, however, the antenna monopulse null direction is not aligned with the target direction, i.e., $f_N \neq f_T$, summing circuit 62 provides an output whose amplitude represents the magnitude of angle or direction error. It should again be pointed out that the error signal is of zero amplitude at $f_N=f_T$, independent of backscatter, only if the gains in the two channels are equal.

On the other hand, if the condition shown in FIG. 8 prevails, then zero output may not be obtained at $f_N=f_T$. Again, the output will be proportional to the area between the lines weighted by the backscattering coefficient in each direction $\theta$. Hence, the output signal will be zero for different slopes only if the backscatter is exactly symmetric around the angle corresponding to $f_T$, a situation which is very unlikely to occur. In fact, for a strong target located near the direction $\theta_2$, the conditions depicted in FIG. 8 might well yield a zero output from the summing circuit 62 with $f_N \neq f_T$.

If gain distribution, as well as overall gain, is matched, the discriminator input bandwidth is not necessarily limited to the linear range of the discriminator. Matching may be achieved most expeditiously in some embodiment by purposely integrating BPF 54 into the discriminator and shaping BPF 58 to match the discriminator output at zero error signal $\epsilon$.

From the foregoing description it should be apparent that the output error signal correctly represents the error between the target direction and the monopulse null direction if the gain in the two channels, supplying signals to the summer 62, is the same. Only under such conditions are lines 71 and 72 parallel. Constant gain in the two channels may be obtained by component matching, precise alignment and adjustment. Also, some gain difference may be tolerated if the resulting accuracy of the error signal is not particularly high. In one particular embodiment it has been calculated that a gain difference of about 1% will generate a pointing error of about $10^{-4}$ radians, under certain flight conditions.

It should be pointed out that various arrangements may be designed to control the gain in the sum and difference channels. The primary novel aspect of the invention is deemed to be the circuitry, necessary to generate the error signal $\epsilon$, by the differentiation of the sum channel signals and its combination with the difference channel signals to produce the term $D-S'$. Consequently, the following brief description of one arrangement for providing channel gain control should be regarded as examplary, only.

Figure 10:
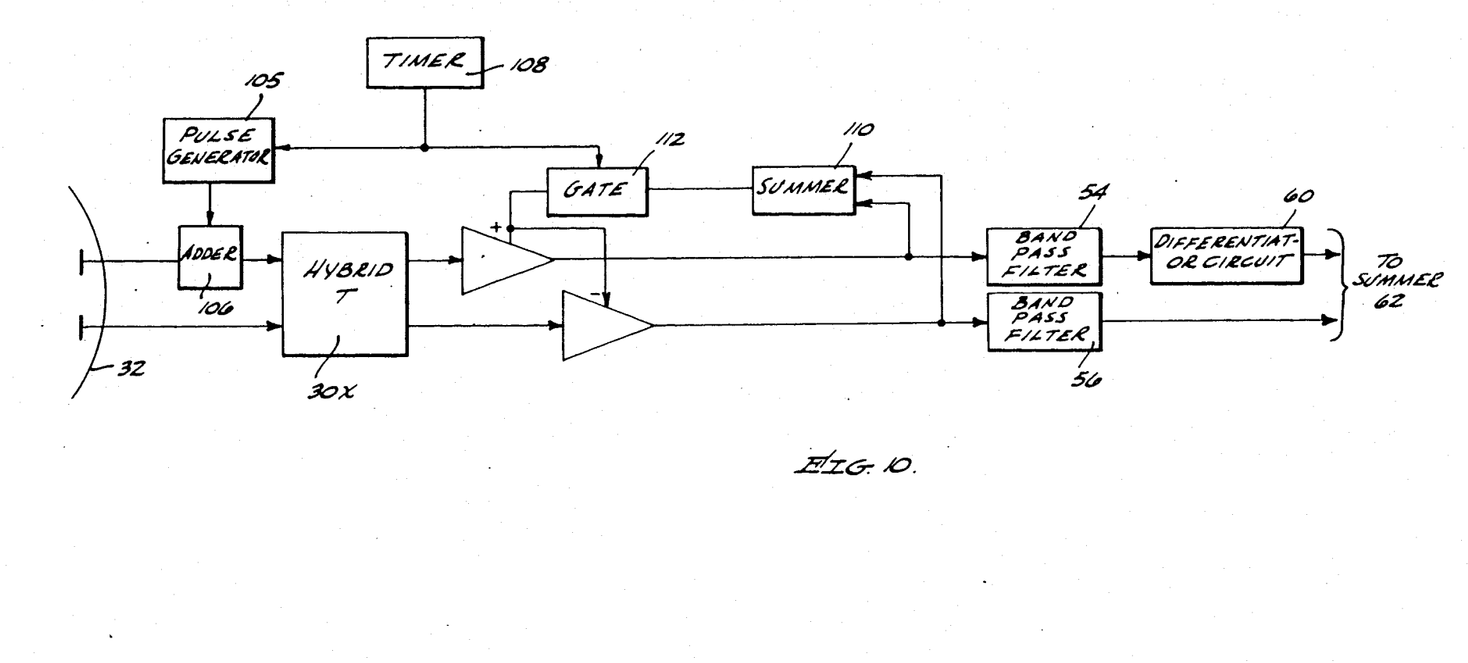
FIG. 10 is a simple block diagram of an arrangement designed to provide channel gain control.

The gains in the sum and difference channels may be continuously balanced by an arrangement as shown in FIG. 10. Therein, gain controlled amplifiers 201 and 202 are shown in the sum and difference channels, between a hybrid T 30X which is assumed to be part of the receiver 30 (FIG. 2) and bandpass filters 54 and 58. Mixers 52 and 56 (FIG. 3) are purposely deleted. A pulse generator 105 is used to provide a microwave pulse which is injected by means of an adder 106 at one input port of the hybrid T 30X immediately following each transmitted pulse. The timing is controlled by a timer 108. The outputs of amplifiers 201 and 202 in response to the test pulse are compared in summer 110 whose output which is gated by gate 112 is used to control the relative gains of amplifiers 201 and 202. Thus, gain control in the two channels is easily realizable. Subsequent stages of the system including filters 54, 56 and 66, circuit 60, summer 62 and multiplier 64 may be permanently matched without active elements, by using box-car amplification and shaping filters.

This method has the advantage that finite angles within the beam width can be detected to the accuracy of antenna calibration, and permanent calibration is possible in flight, using a strong single source and a sensitive inertial sensor on the antenna. Also, $D-S'$ detection is completely independent of ground reflectivity distribution, and of signal-to-noise ratio on the ground return.

In the foregoing description the NCG of the present invention has been described as including a frequency discriminator 60 with a center frequency $f_C=f_{CF}$. It should however be apparent to those familiar with the art that $f_{CF}$ can be made zero, and that the discriminator may be replaced by a differentiating circuit or differentiator. However, in such an arrangement the in-phase and quadrature sum and difference channel signals must be operated upon separately, in order to distinguish between positive and negative frequencies. Consequently, two separate differentiators would be required.

Figure 9:
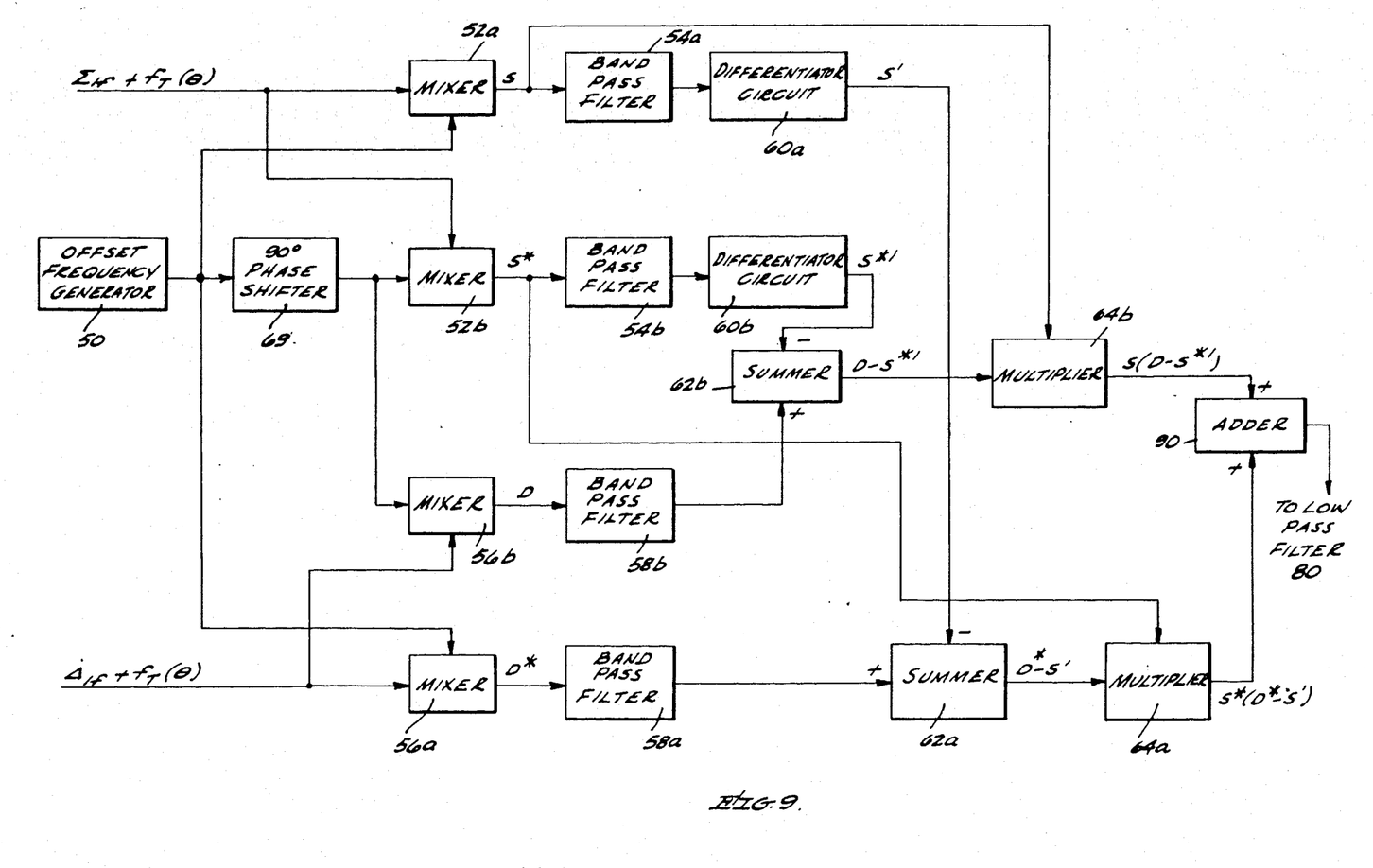
FIG. 9 is a block diagram of another embodiment of the invention.

Such an arrangement is shown in FIG. 9 to which reference is made herein. In FIG. 9, the elements which are used to operate on the in-phase signals and which correspond to the elements shown in FIG. 3 are designated by like numerals followed by the letter a. Likewise the corresponding elements which are used to operate on the quadrature signals are designated by like numerals followed by the letter b.

In such an arrangement, the outputs of multipliers 64a and 64b are added in an adder 90 to provide an output, analogous to that provided by multiplier 64, i.e., the error signal $\epsilon$.

Summarizing the teachings disclosed herein, a novel NCG is disclosed to which are supplied sum and difference channel signals from a monopulse receiver. The NCG is also supplied with a computed doppler frequency of a target to which the antenna monopulse null is to be directed. The signals in the sum and difference channels are first mixed with frequencies from an offset frequency generator. These frequencies include at least the computed target doppler frequency and, preferably, an offset frequency about which the signals in the sum channel are to be discriminated.

The discriminated or differentiated sum channel signals are subtracted, in a summer operating as a subtractor, from the mixed difference channel signals. The summer output is then multiplied in a multiplier with properly phased sum channel signals to provide an output error signal which represents the angle between the target direction and the direction of the antenna monopulse null. The error signal is supplied to an antenna servo unit to automatically null the angle or direction difference.

Figure 11:
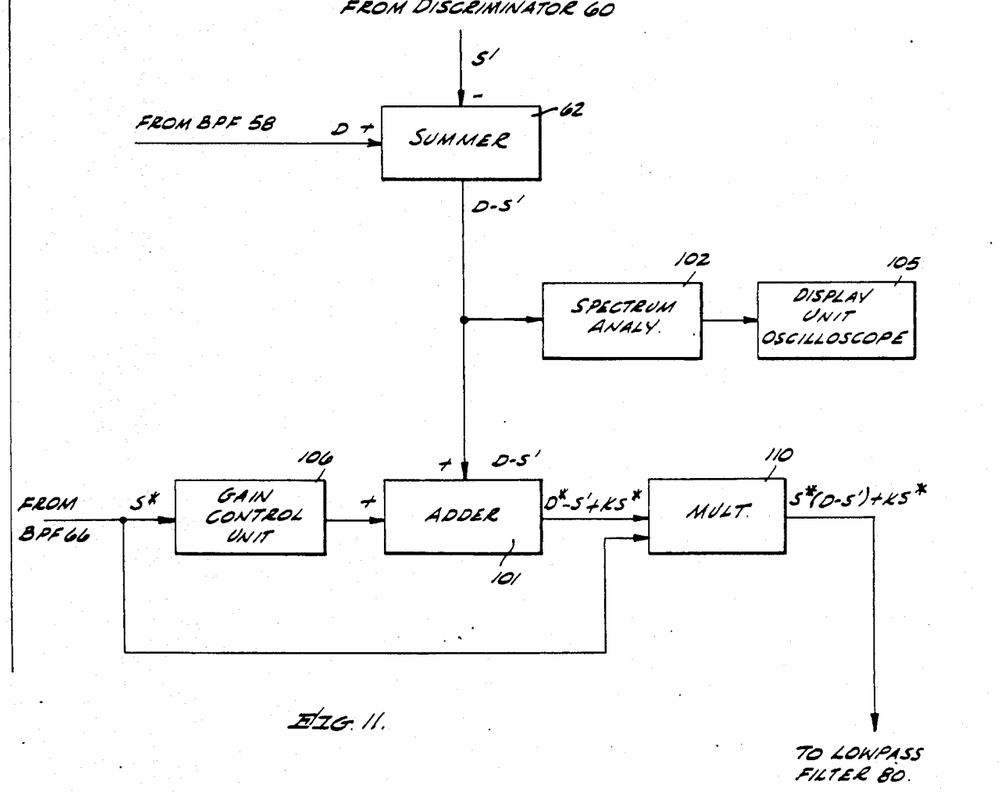
FIG. 11 is a partial block diagram of another embodiment of the invention, designed to provide moving object compensation.

In the foregoing description, although not stated, it has been assumed that the illuminated target area is stationary and does not include any moving objects. If, however, one or more moving objects of significant size were included in the illuminated area, the signal error $\epsilon$ would in all probability be zero when $f_N \neq f_T$. This limitation, however, may be overcome by the addition of a few additional circuits to the NCG to observe the presence of moving objects and compensate therefor. Such additional circuits are shown in FIG. 11 to which reference is made herein.

To sense and compensate for moving objects, the output of summer 62, represented by $D - S'$, is supplied to an adder 101 and to a spectrum analyzer 102. The output of the latter is displayed on a viewable surface of a display unit, for example, an oscilloscope 105. Adder 101 is also supplied with the output of filter 66, representing $S^*$, through a gain control unit 106, with an adjustable gain k. Thus, the output of unit 106 may be represented as $kS^*$ and the output of adder 101 as $D - S' + kS^*$.

The output of adder 101 as well as the signals $S^*$ are multiplied in a multiplier 110. The output of 110, expressible as $$S^*(D - S' + kS^*) = S^*(D - S') + kS^{*2},$$

represents the output of the NCG, which, like in the previously described embodiment, represents the desired error signal. From the above expression it is seen that the first term on the right-hand side of the expression is the same as the output of the multiplier 64 in FIG. 3 or the output of adder 90 in FIG. 9. However, the second term $kS^{*2}$ represents a bias factor or term which is zero when $k=0$.

In practice, the display surface of oscilloscope 105 is viewed by an operator. The presence of a significant moving object in the target area is represented on the display surface by a relatively large sized spike or signal amplitude above the spectrum, representing the stationary portion of the illuminated target area. To compensate for the moving object, the gain k of unit 106 is adjusted until the displayed spectrum, representing the stationary target area, disappears and only the spike, representing the moving object is displayed. Such a value of k multiplied by $S^{*2}$ is the proper signal bias on the error signal which is necessary to compensate for the presence of the moving object in the illuminated target area.

Although, herebefore, the invention has been described in conjunction with target tracking, it should be appreciated that the teachings of the invention are not limited thereto. For example, the null command generator may act as a motion compensator generator in producing a signal which may be used to adjust the frequency of an oscillator which defines a given direction and which is affected by sudden aircraft motion changes. Such a motion compensating signal may be found to be desirable in an airborne monopulse radar system in which reflected energy is used for ground mapping.

Figure 12:
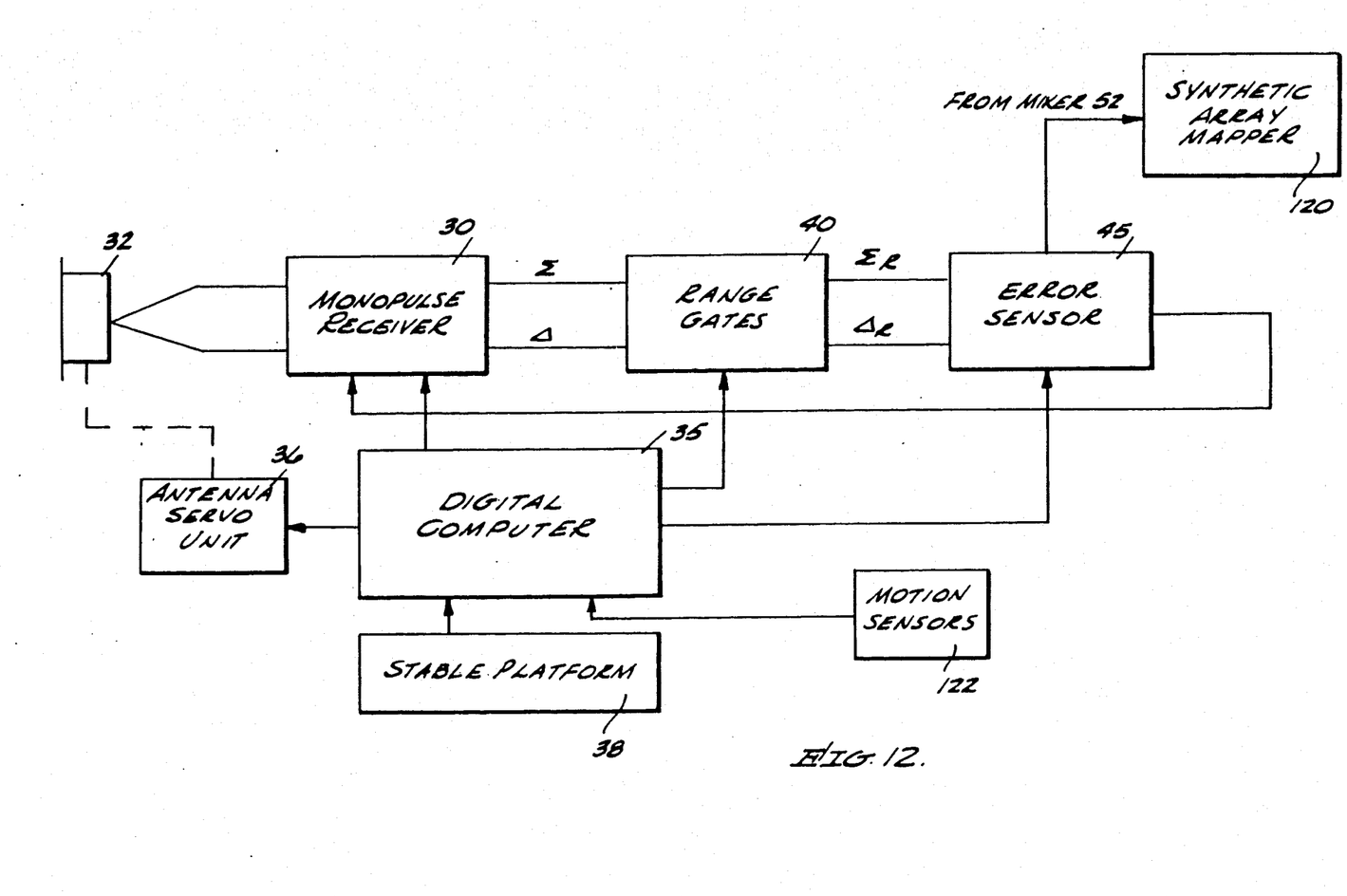
FIG. 12 is a block diagram of yet another embodiment of the invention.

For a better understanding of the use of the teachings of this invention for motion compensation, reference is made to FIG. 12 in which elements, like those previously described, are designated by like numerals. Basically, the arrangement as shown in intended to provide a map of a selected strip of ground as the aircraft flies along a chosen direction, represented by line 15, in FIG. 1. The actual map is produced by a synthetic array mapper 120 which, in prior art systems, receives the range gated sum channel signals. Typically, the monopulse antenna 32 points in the desired direction so that as the aircraft flies, the desired strip of ground is illuminated and mapped. The position of the antenna is controlled by the servo unit 38 which responds to signals from the computer 35. Gross motion changes, sensed by the stable platform 38 and other motion sensors 122, are supplied, as signals, to the computer 35, which also supplies gross motion-compensating signals to the monopulse receiver 30.

Such automatic compensation for deviations of the antenna flight path from a straight line is necessary since the deviations, unless compensated for, would perturb the doppler histories of the ground elements and therefore may produce map smearing. In many applications, however, sudden motion changes cannot be compensated for fast enough in the prior art system to eliminate map smearing. Such compensation is realizable with the arrangement shown in FIG. 12. Basically, the computer, responding to the signals from the motion sensors, in addition to supplying gross motion-compensation signals to the receiver, also supplies signals to an error sensor which is designated by numeral 45, since it performs in a manner substantially identical with the performance of the NCG, previously described.

The error sensor 45, like the NCG, is supplied with range gated sum and difference channel signals. In addition it is supplied with a frequency which corresponds to the sudden motion which has to be compensated for.

Such a frequency is analogous to the frequency or frequencies supplied by the OFG 50 (FIG. 3).

The frequency from the computer is mixed in mixers 52, 56 and 68 whose outputs are then processed as herebefore explained. The output of the error sensor is supplied to the computer to further control the oscillator in the receiver which provides the frequencies for signal mixing, so that the oscillator effectively points along the antenna null. Consequently, this centers the map portion in the radar beam pattern, and if the antenna is held stationary on a target, the map is fully motion-compensated and focused at the center. In such an arrangement, the output of mixer 52 in the sum channel is supplied to the mapper 120, for producing the synthetic array.

It should thus be appreciated that, whereas in the embodiments described in conjunction with FIGS. 3 and 9, the output of the NCG is used to adjust the antenna position so that its null points in the target direction, in the last-described embodiment, the antenna direction is not changed by the output of the error sensor. Rather, its output is used to correct the radar return signals from the antenna, which has become misaligned by the sudden motion change, so that the antenna seems to be pointing in the proper direction, even though its physical position is not adjusted.

It should be pointed out that whereas in the foregoing description of the various embodiments of the invention, signal mixing is shown to take place in the NCG or the error sensor, such arrangements should be regarded only as examples of possible implementations. In practice, it may be preferable to produce the mixing of the sum and difference channel signals with the target doppler frequency or the motion compensating frequency in the monopulse receiver, in which mixing takes place on the incoming radio frequency (RF) signals. Thus, in the broad concept, the mixers may be thought of as being either part of the NCG or part of the monopulse receiver.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A radar receiving system comprising:
monopulse radar receiving means, including a monopulse antenna and a monopulse receiver for producing, in substantiallygain-matched sum and difference channels, a plurality of doppler frequency signals representing energy reflected from a target area;
means, including computing means, for deriving a doppler frequency representative of a target within said target area; and
error signal generating means to which are supplied said signals in said sum and difference channels and said doppler frequency signal, including a bandpass filter in each of said channels, each said bandpass filter having a frequency band width substantially as wide as the doppler freuqency subtended between the 3 db points on the antenna sum pattern of said antenna, for producing an error signal proportional to the difference between the target direction represented by said computed target doppler frequency and the direction of the antenna monopulse null, said error signal generating means including means for differentiating said sum channel signals, and means for subtracting said differentiated signals from said difference channel signals.

2. The radar receiving system as recited in claim 1 wherein said error signal generating means include a lowpass filter for providing an output with an amplitude which is proportional to the direction difference and a polarity which is indicative of the relative location of the monopulse null direction with respect to the target direction.

3. A radar receiving system comprising:
monopulse radar receiving means, including a monopulse antenna and a monopulse receiver for producing, in sum and difference channels, signals receiving energy reflected from a target area;
means, including computer means, for deriving a doppler frequency representative of a target within said target area;
error signal generating means to which are supplied said signals in said sum and difference channels and said signal at said target doppler frequency to produce an error signal proportional to the difference between the target direction represented by said target doppler frequency signal and the direction of the antenna monopulse null, said error signal generating means including a lowpass filter connected to produce an output signal with an amplitude proportional to the direction difference and a polarity indicative of the relative location of the monopulse null direction with respect to the target direction,
a frequency discriminator of a preselected center frequency,
oscillating means producing signals at frequencies including said target doppler frequency and at a fixed preselected frequency which is substantially equal to the discriminator's center frequency,
and means for separately mixing the signals in said sum and difference channels with the signals from said oscillating means.

4. A radar receiving system comprising:
monopulse radar receiving means, including a monopulse antenna and a monopulse receiver to provide, in sum and difference channels, signals representing energy reflected from a target area;
means, including computer means for deriving a doppler frequency representative of a target in said target area;
error signal generating means to which are supplied said signals in said sum and difference channels and said target doppler frequency signal to produce an error signal proportional to the difference between the target direction for said target doppler frequency signal and the direction of the antenna monopulse null, said error signal generating means including oscillating means for generating signals at a fixed frequency and at a frequency corresponding to the computed target doppler frequency, mixing means in said sum and difference channels separately connected to said oscillating means to mix the signals in said sum and difference channels with the signals from said oscillating means, a frequency discriminator with a center frequency substantially equal to said fixed frequency connected to be responsive to the mixed signals in said sum channel for differentiating said mixed sum channel signals, a summer connected to be responsive to the mixed difference channel signals and said differentiated sum channel signals to produce an output signal representing the difference therebetween, output means including phase detecting means connected to be responsive to said summer output and mixed signals in said sum channel to produce an error signal which is a function of the angle between the target direction and the direction of the antenna monopulse null.

5. In a monopulse radar system the combination of:
radar receiving means including an antenna for responding to return radar signals to provide signals in substantially gain-matched sum and difference channels;
means for providing control signals at a controlled frequency representing a known parameter;
means for combining the sum and difference channel signals with said control signals;
circuit means for differentiating said combined sum channel signals and for subtracting said differentiated sum channel signals from the combined difference channel signals; and
output means for utilizing the output of said circuit means.

6. The monopulse radar system as recited in claim 5 wherein said output means include a multiplier for multiplying the output of said circuit means with phased sum channel signals to provide an output, representative of the error between the monopulse null direction of said antenna and said parameter.

7. In a monopulse radar system including radar receiving means and an antenna for responding to return radar signals and including means for producing signals in sum and difference channels: means for producing control signals including a computer to generate and deliver control signals to said sum and difference channels at a frequency representative of the doppler frequency of a target;
combining means for combining said control signals with said sum and difference channel signals;
circuit means for differentiating said combined sum channel signals and for subtracting said differentiated sum channel signals from said combined difference channel signals;
a multiplier connected to multiply the output signal of said circuit means with phased sum channel signals to produce a signal representing the magnitude and direction of an error between the target direction and the antenna monopulse null direction, and means utilizing the multiplier output to adjust said antenna automatically to minimize said direction error.

8. In a monopulse radar system including radar receiving means having an antenna for responding to return radar signals and sum and difference channels, the combination of:
means for producing control signals at a controlled frequency representing a monopulse parameter;
means for separately combining the sum and difference channels signals with said control signals;
circuit means for differentiating said combined sum channel signals and for subtracting said differentiated sum channel signals from said combined difference channel signals;
adjustable gain control means to which phased sum channel signals are supplied;
adding means for adding the output of said gain control means to the difference between said combined difference channel signals and the difference between said combined difference channel signals and the differentiated sum channel signals; and
a multiplier connected to multiply the output signal of said adding means by the signals supplied to said adjustable gain control means.

9. The monopulse radar system as recited in claim 5 which is airborne to track a ground target from which said radar return signals are received, said means for providing said control signals including computing means for providing signals at a controlled frequency, representing the target's doppler frequency, the system's output means including a multiplier and a lowpass filter for providing an output error signal whose amplitude represents the direction difference between the target direction and the antenna monopulse null direction, and whose polarity represents the error direction.

10. In a monopulse radar system including radar receiving means having an antenna for responding to radar signals and sum and difference channels, in combination:
means for separately combining the signals from the sum and difference channels with said control signals;
circuit means for differentiating said combined sum channel signals and for subtracting said differentiated sum channel signals from the combined difference channel signals;
output means for utilizing the output of said circuit means, including a multiplier and a lowpass filter for producing an output error signal whose amplitude represents the direction difference between the target direction and the antenna monopulse null direction, and whose polarity represents the error direction; and
means for controlling said output error signal to produce a signal which is a measure of said direction difference in the presence of a moving object in the target area.

11. In an airborne monopulse radar system including radar receiving means having an antenna for responding to return radar signals and sum and difference channels, means to produce a synthetic array map of a strip of ground comprising:
means for producing control signals including computing means responsive to motion-indicating signals, to produce control signals at controlled frequencies representative of motion parameters;
means for combining the sum and difference channel signals with said control signals;
circuit means for differentiating said combined sum channel signals and for subtracting said differentiated sum channel signals from the combined difference channel signals, the output of said circuit means representing the error between the actual antenna monopulse null direction and a direction representative of the desired direction of said null towards said ground due to said motion parameters; and
output means for utilizing said circuit means.

12. In a radar receiving system including monopulse radar receiving means having a monopulse antenna and a monopulse receiver to provide, in sum and difference channels, signals representative of energy reflected from a target area, including means, having computer means, for deriving a doppler frequency representative of a target in said target area, and having error signal generating means to which are supplied said signals in said sum and difference channels and said target doppler frequency signals to produce an error signal proportional to the difference between the target direction having said target doppler frequency signal and the direction of the antenna monopulse null, the improvement comprising:

oscillating means for generating signals at a fixed frequency and at a frequency corresponding to the computed target doppler frequency;

mixing means for separately mixing the signals in said sum and difference channels with the signals from said oscillating means;

a frequency discriminator with a center frequency equal to said fixed frequency, responsive to the mixed signals in said sum channel, for differentiating said mixed sum channel signals;

a summer, connected to be responsive to the mixed difference channel signals and said differentiated sum channel signals, to produce an output representing the difference therebetween; and output means, including phase detecting means, connected to be responsive to said summer output and mixed signals in said sum channel, to produce an error signal which is a function of the angle between the target direction and the direction of the antenna monopulse null.

13. In a monopulse radar system including radar receiving means having an antenna for responding to return radar signals to produce signals in sum and difference channels, means for providing control signals at a controlled frequency representing a known parameter, means for combining the sum and difference channel signals with said control signals, circuit means for differentiating said combined sum channel signals and for subtracting said differentiated sum channel signals from the combined difference channel signals, and output means including a multiplier for multiplying the output of said circuit means with phased sum channel signals, the improvement comprising:

a computer for providing said control signals at a frequency representative of the doppler frequency of a target;

the output of said multiplier being a measure representing the magnitude and direction of an error between the target direction and the antenna monopulse null direction; and means utilizing the multiplier output to adjust said antenna automatically to minimize said direction error.

14. In a monopulse radar system including radar receiving means having an antenna for responding to return radar signals to provide signals in sum and difference channels, means for providing control signals at a controlled frequency representing a known parameter, means for combining the sum and difference channel signals with said control signals, circuit means for differentiating said combined sum channel signals and for subtracting said differentiated sum channels from the combined difference channel signals, and output means for utilizing the output of said circuit means, the improvement comprising:

adjustable gain control means to which phased sum channel signals are supplied;

adding means for adding the output of said gain control means to the difference between said combined difference channel signals and the differentiated sum channel signals; and a multiplier for multiplying the output of said adding means by the signals supplied to said adjustable gain control means.

15. In an airborne monopulse radar system including radar receiving means having an antenna for responding to return radar signals from a tracked ground target to provide signals in sum and difference channels, means for providing control signals at a controlled frequency representing a known parameter including computing means for providing said control signals at a controlled frequency representing the target's doppler frequency, means for combining the sum and difference channel signals with said control signals, circuit means for differentiating said combined sum channel signals and for subtracting said differentiated sum channels from the combined difference channel signals, and output means including a multiplier and a lowpass filter for providing an output error signal whose amplitude represents the direction difference between the target direction and the antenna monopulse null direction and whose polarity represents the error direction, for utilizing the output of said circuit means, the improvement comprising:

means for controlling said output error signal to represent said direction difference in the presence of a moving object in the target area.

16. In an airborne monopulse radar system including radar receiving means having an antenna for responding to return radar signals to provide signals in sum and difference channels, means for providing control signals at a controlled frequency representing a known parameter, means for combining the sum and difference channel signals with said control signals, circuit means for differentiating said combined sum channel signals and for subtracting said differentiated sum channel signals from the combined difference channel signals, and output means for utilizing the output of said circuit means, the improvement comprising:

means for producing a synthetic array map of a strip of ground;

said means for providing said control signals including computing means responsive to motion-indicating signals, to provide control signals representative of motion parameters;

the output of said circuit means representing the error between the actual antenna monopulse null direction and a direction representative of the desired direction of said null toward said ground due to said motion parameters.

* * * * *